(No Model.)

A. J. STOLL.
ICE AND SALT MIXING APPARATUS.

No. 285,521. Patented Sept. 25, 1883.

Attest:

Inventor.
Adam J. Stoll

UNITED STATES PATENT OFFICE.

ADAM J. STOLL, OF SANDUSKY, OHIO.

ICE AND SALT MIXING APPARATUS.

SPECIFICATION forming part of Letters Patent No. 285,521, dated September 25, 1883.

Application filed June 16, 1883. (No model.)

*To all whom it may concern:*

Be it known that I, ADAM J. STOLL, of Sandusky, in the county of Erie and State of Ohio, have invented new and useful Improvements in Ice and Salt Mixing Apparatus; and I do hereby declare that the following is a full, clear, and exact description thereof, reference being had to the accompanying drawings, which form a part of this specification.

This invention relates to an improvement in mixing apparatus; and the invention consists in the combination of the different parts, whereby the operation of charging and discharging the mixer is greatly facilitated and effected in a minimum of time. In the process of mixing ice and salt for obtaining a freezing-mixture it is important to charge, mix, and withdraw the ingredients in the shortest space of time, so as to gain all of the freezing time of the mixture where it is wanted, and my apparatus is especially adapted for such purpose—as, for instance, in the process of freezing fish, where measured quantities of the freezing-mixture are required at short intervals.

Figure 1:
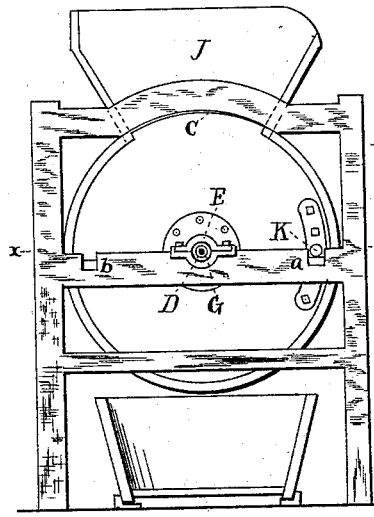
Figure 2:
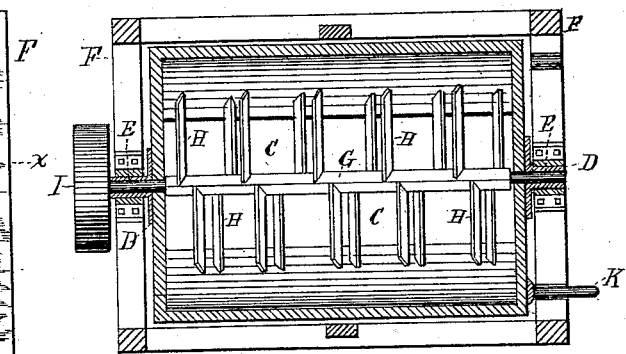
Figure 3:
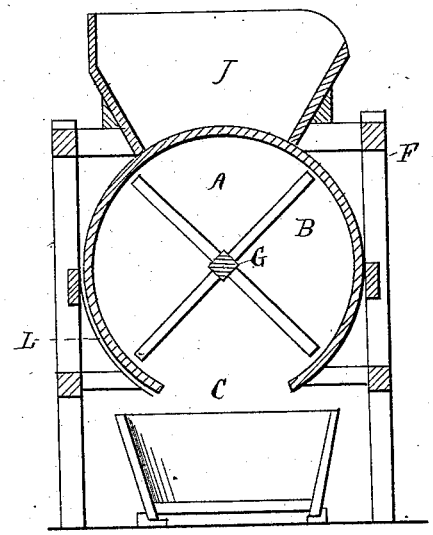

In the drawings which accompany this specification, Figure 1 is an end view of my apparatus. Fig. 2 is a horizontal section on line X X. Fig. 3 is a vertical cross-section.

A is a cylindrical vessel or tube forming a tight cylindrical compartment.

C is an opening in the cylindrical wall of the vessel.

D D are hollow trunnions centrally secured to each head of the vessel.

E are journals for the trunnions D D.

F is the frame upon which the apparatus is supported.

G is a shaft passing centrally through the vessel A, the hollow trunnions D D forming its bearings.

H are mixing-blades secured to the shaft G.

I is a pulley secured upon one end of the shaft G.

J is a hopper centrally secured over the vessel G and fitting closely onto the same. Its open bottom corresponds in size with the opening C in the vessel.

K is a handle secured upon one end of the vessel A. By means of this handle the mixing-vessel A can be readily turned one-half revolution with the handle at $a$ in Fig. 1. The opening C of the mixing-vessel is on top and registers with the discharge-opening of the hopper and with the handle at $b$. The opening C is brought to the bottom, forming a discharge-opening to the mixing-vessel A.

In practice, to begin the operation, the handle K has to be in the position at $b$, so as to close the bottom of the hopper by the wall of the mixing-vessel. The hopper is first filled with crushed ice, with the necessary quantity of salt added on top. The operator then turns the mixing-vessel one-half revolution. This brings the opening C directly under the discharge-opening of the hopper and lets the contents drop into the mixing-vessel, where the mixing-blades (to which motion is given by means of the pulley I) act upon it. As soon as the mixing is properly completed the operator reverses the mixing-tub one-half revolution, which brings it into its starting position, and allows the contents of the mixing-vessel to drop out and fall into a tray, box, or chute, by means of which it can be quickly removed to the place where the freezing-mixture is wanted. The mixing-vessel is at the same time in proper position to start a new operation. To perform the whole operation of mixing with the utmost dispatch it is of course necessary that the mixing-blades shall perform efficient work. In the drawings, four series of radial bars are shown, which are set angularly upon the shaft and so as to throw the contents of the mixing-vessel to and fro. These blades also assist the discharge of the contents, and while the apparatus is in use they are kept constantly revolving. The hopper J is made of proper size to contain a measured charge, so as to obviate any loss of time in charging. To receive the impact of the handles K rubber cushions are provided at $a$ and $b$, and to prevent the spilling of the contents in discharging an apron, L, is secured to the frame.

What I claim as my invention is—

1. In a mixer for the purposes described, and wherein a rotating shaft with mixing-blades attached revolves in a mixing-tub, a cylindrical mixing-tub being upon hollow trunnions and adapted to be rotated one-half revolution, so as to make an opening in its wall register with the discharge-opening of a hopper on top, or be turned down to discharge the contents received from the hopper, while the walls of the mixing-tub close the discharge end of the hopper, substantially as described.

2. In a mixer for the purposes described, the combination of the cylindrical mixing-tub A, opening C, trunnions D, supporting-frame F, shaft G, mixing-blades H, hopper J, and handle K, all arranged and combined substantially as and for the purpose described.

ADAM J. STOLL.

Witnesses:
C. H. MYERS,
J. W. RUPPRECHT.